United States Patent [19]

Chakravarty et al.

[11] Patent Number: 5,072,893
[45] Date of Patent: Dec. 17, 1991

[54] AIRCRAFT MODAL SUPPRESSION SYSTEM

[75] Inventors: Abhijit J. M. Chakravarty, Renton; Steven R. Cooper, Seattle; John K. H. Ho, Renton; Chuong B. Tran, Everett, all of Wash.

[73] Assignee: The Boeing Company, Seattle, Wash.

[21] Appl. No.: 55,801

[22] Filed: May 28, 1987

[51] Int. Cl.⁵ .............................................. B64L 13/16
[52] U.S. Cl. .................................. 244/76 R; 244/194
[58] Field of Search ............... 241/76 R, 76 C, 191, 241/193, 194, 184, 175, 177; 364/434

[56] References Cited

U.S. PATENT DOCUMENTS

| 2,832,551 | 4/1958 | Gille | 244/76 C |
| 2,985,409 | 5/1961 | Atwood et al. | 244/191 |
| 3,079,108 | 2/1963 | Falkner et al. | 244/76 C |
| 3,240,447 | 3/1966 | Olshausen | 244/76 C |
| 3,347,498 | 10/1967 | Prietley et al. | 244/191 |
| 3,374,966 | 3/1968 | Howard | 244/76 C |
| 3,902,686 | 9/1975 | Wykes | 244/191 |

Primary Examiner—Galen Barefoot
Attorney, Agent, or Firm—J. P. Hamley; B. A. Donahue

[57] ABSTRACT

Accelerations due to excitation of the natural modes of an aircraft's body are suppressed by an active suppression system. Dedicated accelerometers are positioned in the aircraft at optimal locations for sensing modal induced lateral accelerations. The accelerometer produced signals are processed through control logic which, in response thereto, and in response to aircraft velocity and altitude related signals produces output control signals. The control signals effect rudder deployment creating forces to suppress the natural mode induced accelerations.

19 Claims, 5 Drawing Sheets

AIRCRAFT MODAL SUPPRESSION SYSTEM

BACKGROUND OF THE INVENTION

The present invention is directed to the aircraft flight control art and, in particular, to an active control system for suppressing aircraft body accelerations due to natural mode excitations.

Large aircraft, particularly those having a high length to diameter ratio, are subject to gust induced lateral accelerations of the tail section as a result of excitation of natural modes of the aircraft body. These lateral accelerations are particularly objectionable in commercial aircraft since they can result in the discomfort of aft seated passengers.

While modern commercial aircraft employ flight control yaw dampers to reduce yawing rates, such yaw dampers lack the capability to suppress flexible body mode accelerations. For aircraft in which the slenderness ratio (i.e., ratio of length to diameter) is not excessive, techniques employing a yaw damper operating at the Dutch Roll frequency and a notch filter at the location of the first body mode have proved successful in not exciting the structural osillation. Such systems are generally referred to as passive methods for controlling structural oscillation.

However, for aircraft having a higher slenderness ratio, and thus exhibiting a more severe oscillation in which the frequency of oscillation changes with varying flight conditions an active modal suppression system is required. One such prior system employs information from the onboard inertial reference system (IRS) to determine yawing of the aircraft and thereby develop a signal which, when passed through the yaw damper, is suitable for deploying the rudder to counteract the effect of the induced oscillation. This system is inadequate in high slenderness ratio aircraft as the signal sensed by the IRS, and the control law used therewith, do not fully define the accelerations experienced by the aft section of the aircraft structure.

There is a need in the aircraft flight control art, therefore, for an active modal suppression system which is capable of accurately monitoring aircraft structural accelerations due to excitation of natural aircraft modes and an associated control system to deploy aircraft control surfaces for suppressing aircraft body deflections due to modal oscillations.

SUMMARY OF THE INVENTION

The present invention, therefore, is directed to an active aircraft modal suppression system which is capable of accurately sensing modal induced oscillations and producing control signals to deploy control surfaces to suppress such accelerations.

Briefly, according to the invention, an aircraft modal suppression control system suppresses aircraft body deflections due to natural body flexure modes and comprises control surface means which is controllably deployable in response to input control signals. An accelerometer is predeterminedly located on the aircraft body to produce an acceleration signal representative of acceleration of the body in a predetermined natural mode. In a particular implementation of the invention, the first and second lateral modes are sensed. Also, conventional means are employed to produce a velocity signal representative of aircraft velocity. Control logic is responsive both to the accelerometer produced signal and the aircraft velocity signal to produce an output control signal responsive to the acceleration signal and to the aircraft velocity signal such that the control surface is deployed to create forces on the aircraft body to suppress the natural mode induced accelerations.

In a further aspect of the invention, conventional altitude means produces an altitude signal representative of aircraft altitude and the control logic includes means responsive to the altitude signal for producing the control surface control signals.

In a further aspect of the invention, the signals produced by the predeterminedly located accelerometer are processed through band pass filters at the right phase to isolate the desired modal induced signals. In the preferred embodiment, a fourth order band pass filter is utilized to isolate the first mode, whereas a second order band pass filter isolates the second mode.

As shown in alternate embodiments of the invention, either one or two accelerometers may be used to sense the first and second natural modes.

DETAILED DESCRIPTION

Figure 1:
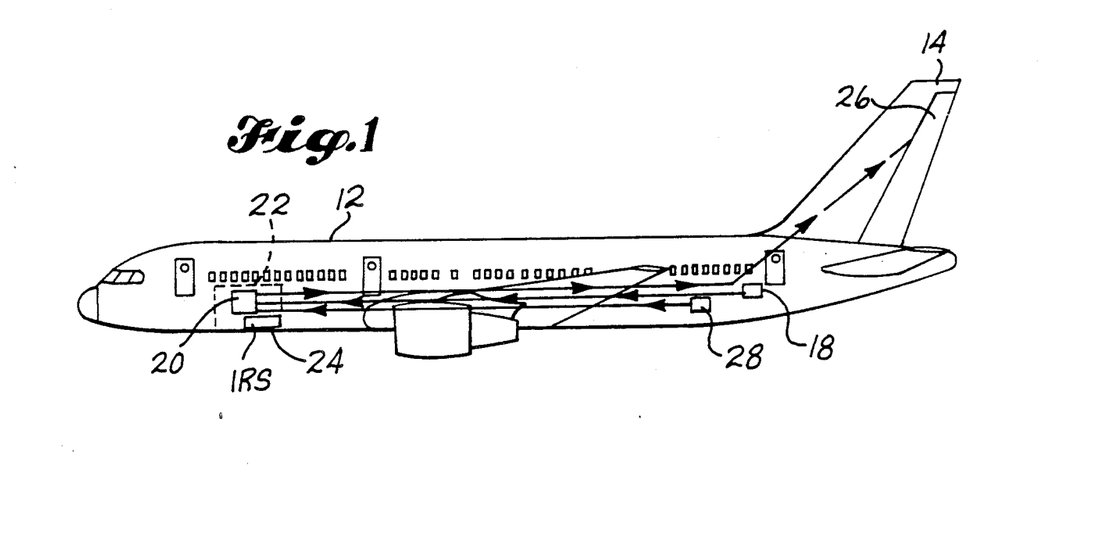
FIG. 1 is a side view of a conventional commercial aircraft and depicts the positioning of accelerometers to sense lateral mode accelerations.

FIG. 1 is a side view of a conventional commercial aircraft illustrating the body, or fuselage 12 and the tail 14. The problem exhibited by such aircraft to which the present invention is addressed is that the flexible structure is subject to accelerations resulting from external forces, such as gusts, exciting natural resonant modes of the body. Of particular concern due to passenger discomfort are the lateral modes (i.e., into and out of the drawing), which manifest as accelerations in the aft section, generally referred to in the figure with reference numeral 16.

The present invention is an active system for suppressing accelerations due to lateral mode excitation.

First, an observability study was performed to determine a location on the aircraft that optimally senses accelerations resulting from excitation of the first lateral mode. In the example shown in FIG. 1 which represents a study on a model 767-300 aircraft, the aft bulkhead was found to be an excellent location to observe the first mode. Thus, an accelerometer 18 was positioned at this location. As discussed in this Specification, the accelerometers employed are commercially available and produce an output digital signal representative of sensed acceleration. The output from the first modal accelerometer 18 is routed to the yaw damper 20 which is located in the electronics equipment bay 22 in the forward belly of the aircraft. Also included in the electronics equipment bay 22 is the aircraft's onboard inertial reference system (IRS) 24. The control signals produced at the output of the yaw damper 20 are routed to the tail 14 where they are applied to the actuation system for the aircraft's rudder 26. The yaw damper 20, in the conventional manner, produces control signals to cause deployment of the rudder 26 to reduce undesired yaw of the aircraft. However, it has been found that the yaw damper does not suppress lateral accelerations on the aft section of the aircraft due to induced excitation of the natural modes.

Figure 5:
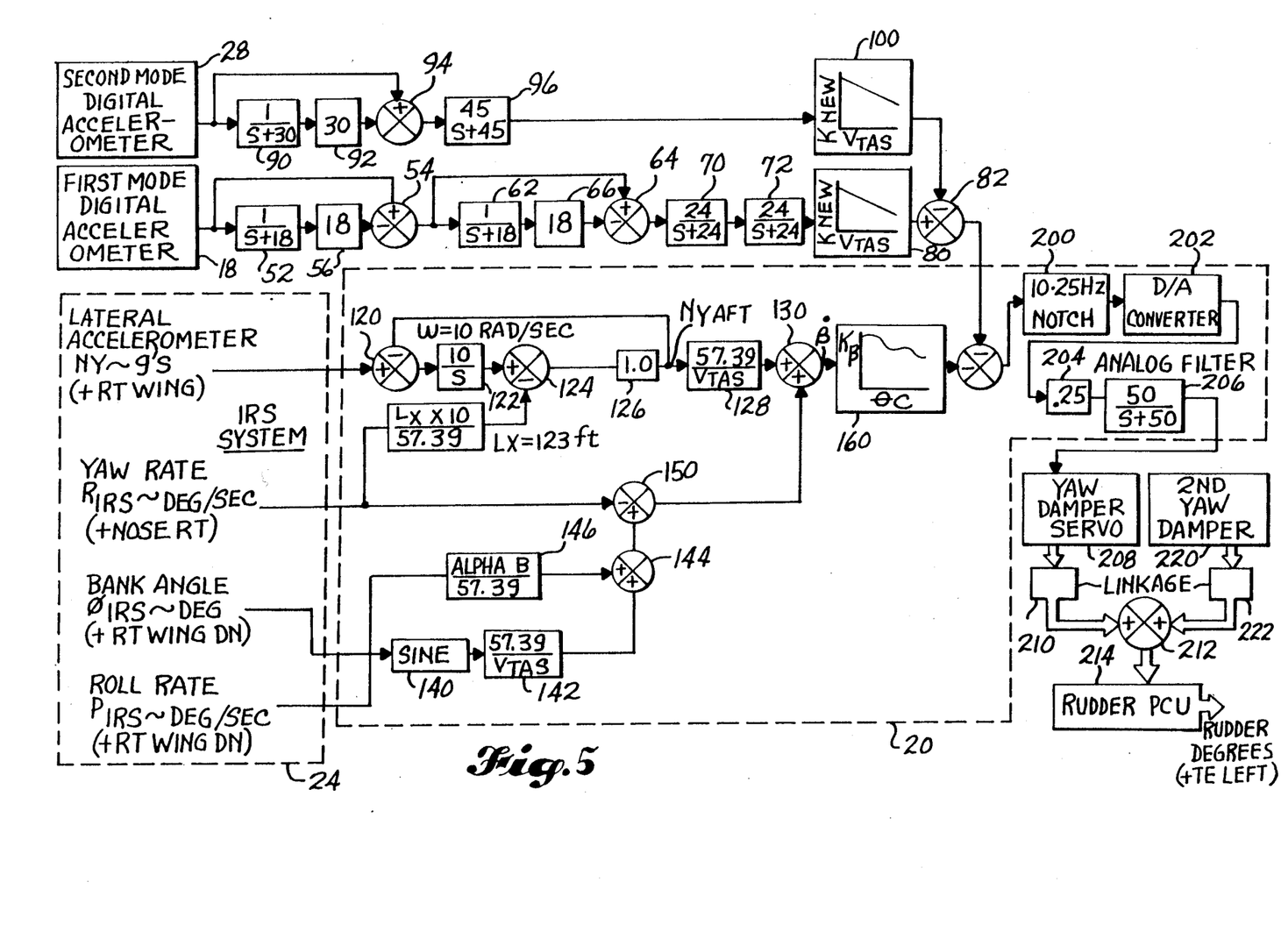
FIG. 5 is a detailed block diagram illustrating the preferred embodiment of the two-accelerometer modal suppression system according to the present invention.
Figure 6:
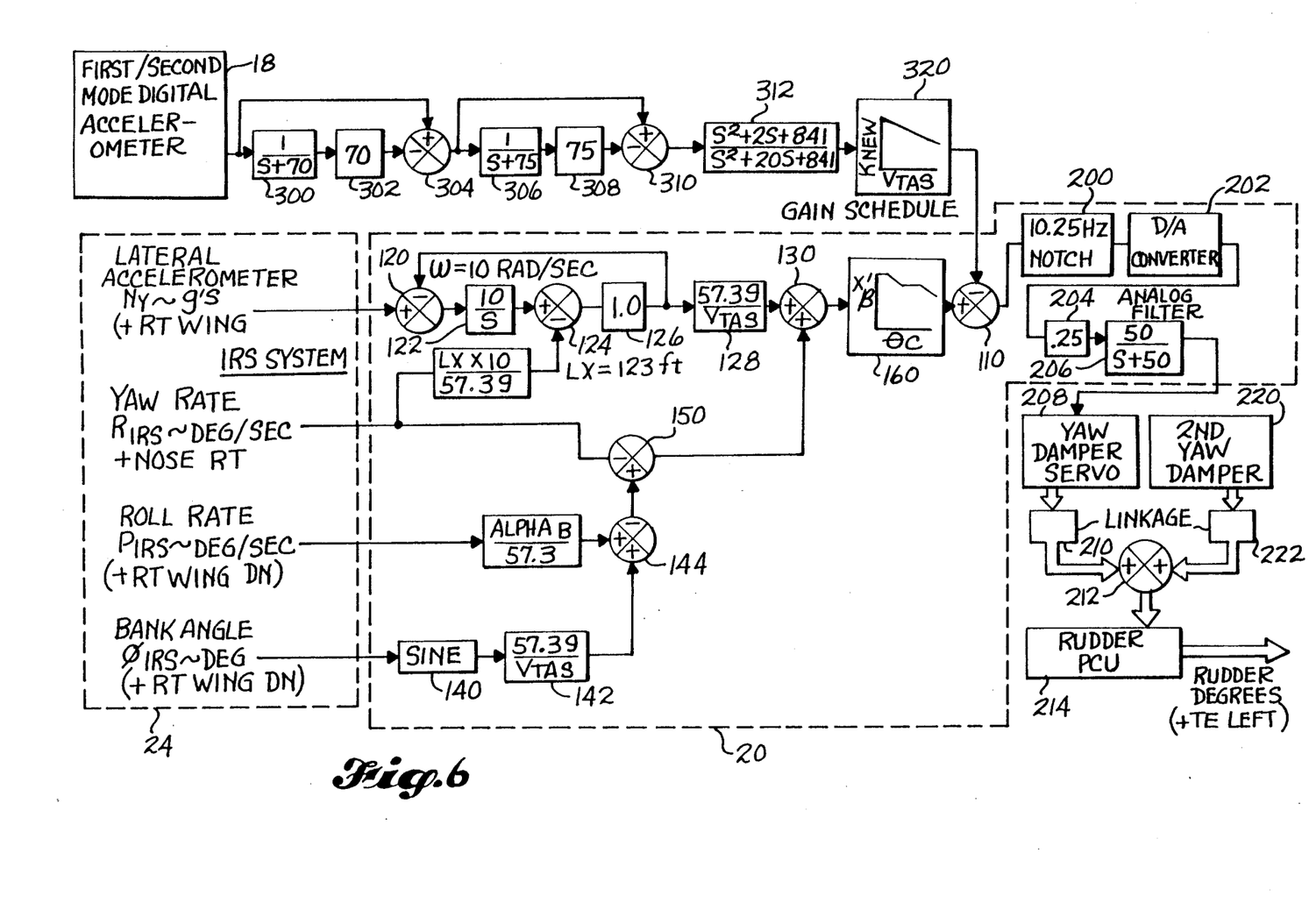
FIG. 6 is a detailed block diagram illustrating the preferred single accelerometer modal suppression system according to the present invention.

As described in detail with respect to the preferred embodiment illustrated in FIG. 6, the first accelerometer 18 may be used to sense both first and second mode accelerations. This has the distinct advantage of utilizing less hardware, requiring less installation time and being more reliable, than the two-accelerometer embodiment illustrated in detail in FIG. 5.

Figure 2:
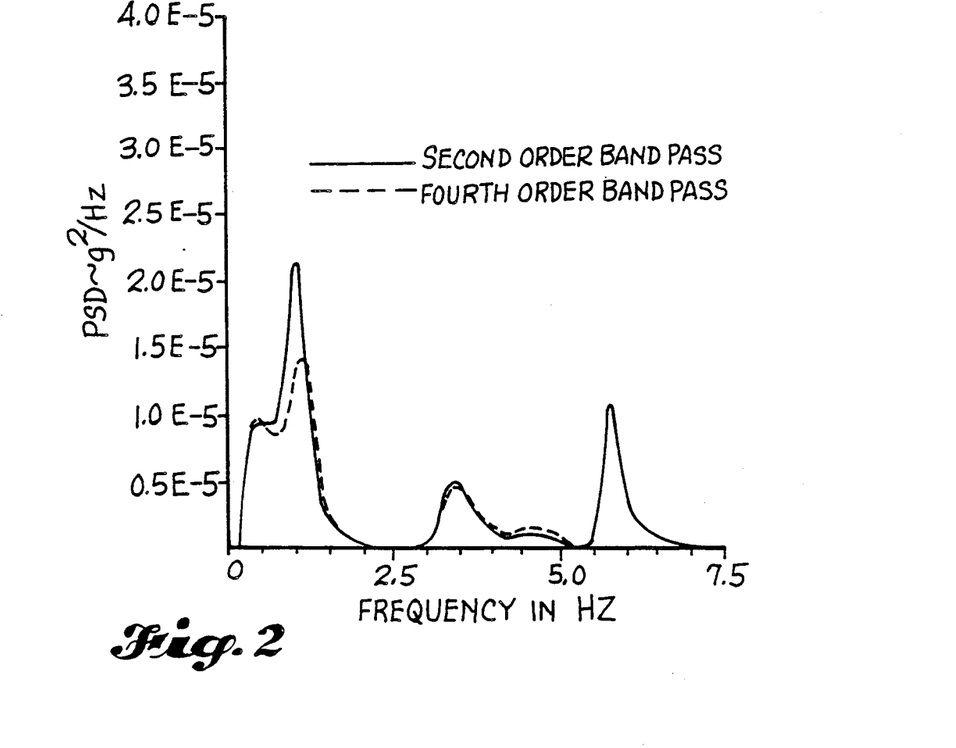
FIG. 2 is a power spectral density graph illustrating the improvement of a fourth order band pass filter over a second order band pass filter to filter the first mode accelerometer produced signal.

Initially, a second order band pass filter was employed to filter signals from the digital accelerometer 18 to isolate accelerations due to excitation of the first body mode. This signal was then passed to the yaw damper where, acting in parallel to the yaw damper signal, it was applied to the rudder 26 to thereby suppress first mode induced accelerations. Shown in solid line in FIG. 2 is the power spectral density of the first mode accelerations resulting from the use of the second order filter in the yaw damper parallel path.

It was found, however, that some information from both Dutch Roll and the second body mode excitations was passing through this path and exciting these two additional modes. Hence, a fourth order band pass filter was used and, as shown in the dashed line of FIG. 2, improved modal suppression was achieved.

It was then found that the second body mode could be reduced by adding a second parallel path. The second path included a second digital sensor 28 which was positioned at the aft galley—a position determined to optimally exhibit second mode accelerations. The output from the second accelerometer 28 was passed through a second order band pass filter to isolate the second mode signal. The second mode signal was then passed in parallel to the first mode signal through the yaw damper to the rudder.

Figure 3:
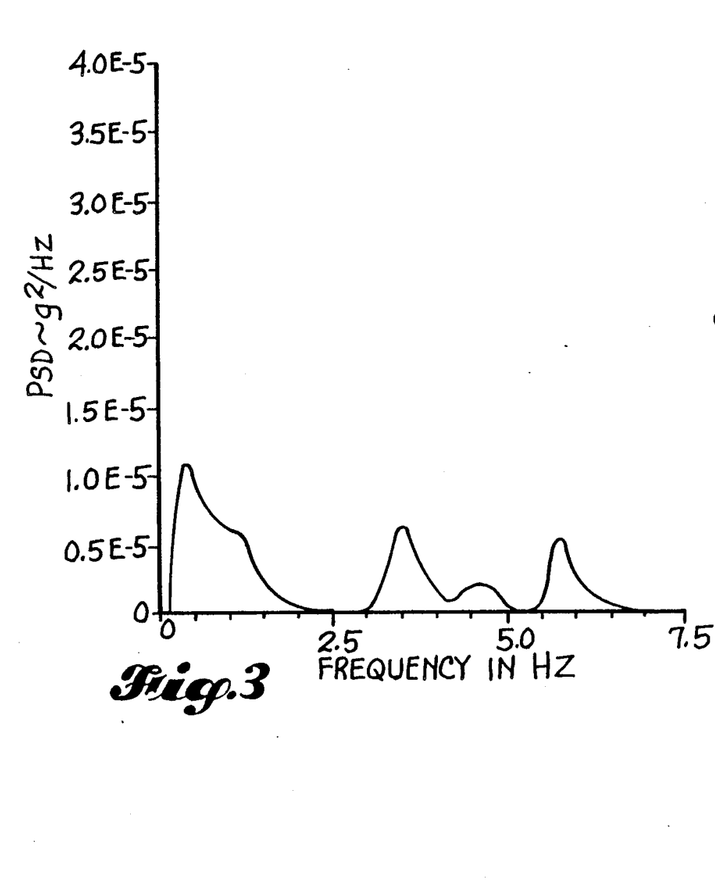
FIG. 3 is a power spectral density graph illustrating the adequacy of a second order band pass filter for use with the second accelerometer produced signal.

FIG. 3 is a power spectral density graph illustrating the level of the lateral acceleration at the aft galley. Here, the second order band pass filter is adequate to reduce unwanted frequency signals. The gains of the two parallel paths from the accelerometers 18, 28 were adjusted to meet a stability criteria of a 6 dB gain margin and a 45° phase margin. The Dutch Roll damping was found to be 0.96 (a damping of 1.0 is considered highly damped). In the presence of the two parallel paths, the yaw damper servo rate had to be increased from 35 radians per second to 70 radians per second to obtain satisfactory results.

Figure 4:
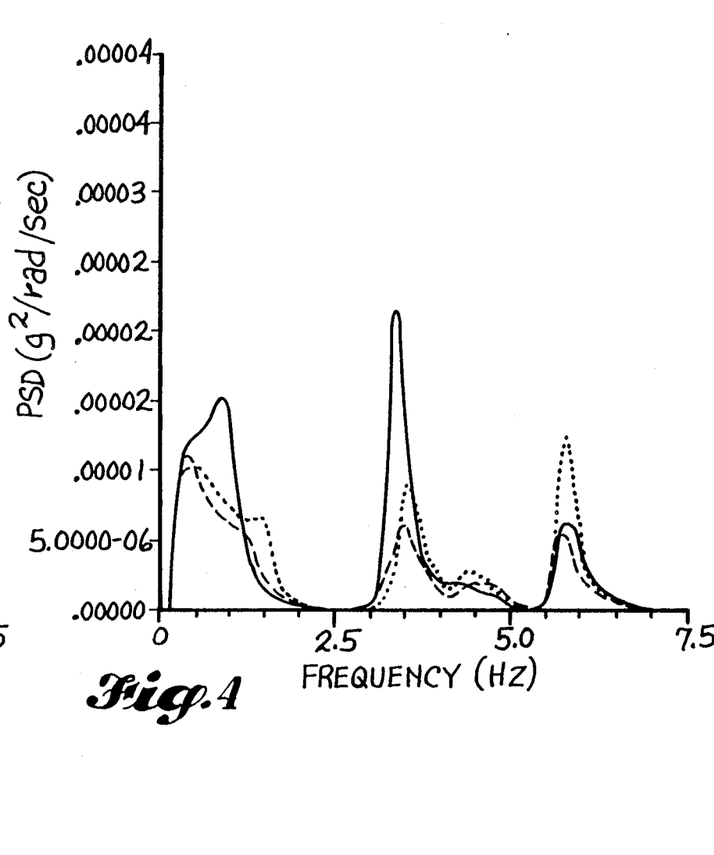
FIG. 4 is a power spectral density graph illustrating the improvements in modal suppression of the present system over those systems known to the prior art.

FIG. 4 is a power spectral density plot illustrating lateral acceleration at the aft galley of the aircraft due to lateral gust inputs. Here, the solid line represents the response of the aircraft as a result of the conventional ride quality yaw damper. The dotted line illustrates a prior art approach which was an active system that did not employ the positioned accelerometers. The dashed line illustrates the improvements achieved due to the present modal suppression system.

FIG. 5 is a detailed block diagram illustrating the preferred embodiment of the two-accelerometer modal suppression system according to the present invention. As mentioned with respect to FIG. 1, the produced first and second digital accelerometer signals 18, 28, respectively, are filtered, in a manner to be described hereinbelow, then gain factored as a function of aircraft total airspeed (also described hereinbelow) and added in parallel to the ride quality yaw damper control law 20 produced signal.

Thus, the digital output from the first mode digital accelerometer 18 is passed both to the input of a low pass filter 52 and to the positive input of a summer 54. The transfer characteristics for the various filter elemental blocks as described herein is illustrative of one preferred embodiment. It will be understood by those of ordinary skill in the art that the implementation of alternate filter embodiments will require a determination of the desired filter band pass characteristics and, therefore, an appropriate change to the elemental transfer functions. As used in these figures, the symbol "s" represents the Laplace operator.

The output from the low pass filter 52 is then multiplied by a constant in gain block 56 before being applied to the negative input of summer 54. The output from summer 54 is, thus, the first mode digital accelerometer signal minus a defined low pass characteristic, i.e., a high pass filtered accelerometer signal.

The signal out of summer 54 is passed through a similar sequence of blocks 62, 64 and 66 to blocks 52, 54 and 56, respectively. The output from summer 64 is, thus, the first mode accelerometer signal as passed through a second order high pass filter.

The output signal from summer 64 is then passed through two successive low pass filters 70, 72 to thereby realize the full fourth order band pass filtering of the first accelerometer signal.

The fully fourth order band pass filtered first mode accelerometer signal is then passed through a gain schedule block 80. Since the ultimate control signal from the modal suppression system will be passed to the rudder of the aircraft, and inasmuch as the force produced by the rudder is a function of airspeed, the first mode accelerometer signal is gain amplified by a gain factor $K_{new}$ which reduces in value as aircraft total airspeed $V_{TAS}$ increases. The resultant first mode signal is applied to the positive input of a summer 82.

The output signal from the second mode digital accelerometer 28 is passed both to the input of a low pass filter, comprised of blocks 90, 92, and to the positive input of a summer 94. Passed to the negative input of summer 94 is the output from the low pass filter 90, 92. Thus, the output from summer 94 is the high pass filtered second mode accelerometer signal. The output from summer 94 is passed through a low pass filter 96 to thereby produce the first order band pass filtered second mode accelerometer signal. As with the first mode accelerometer signal, the band pass filtered second accelerometer signal is passed through a gain schedule block 100. Gain schedule block 100 multiplies the band pass filtered second accelerometer signal by a level which decreases with increasing aircraft total airspeed.

The output from the gain schedule block 100 is passed to the minus input of the summer 82. In reality, summer 82 sums the filtered first and second accelerometer signals. The sign difference in summer 82 simply reflects signal inversions that take place through the processing. Thus, the output from summer 82 is a composite signal representing aircraft accelerations induced by excitation of the first and second natural modes. This composite signal is added to a yaw damper control 20 produced signal in a summer 110.

The yaw damper control law 20 receives four signals from the aircraft's onboard IRS system 24. These signals are: a lateral accelerometer produced signal $N_y$ which is positive for lateral accelerations to the right of the aircraft, a yaw rate signal R which is positive for yaw rates forcing the nose to the right, a bank angle signal $\phi$ which is positive for the right wing deflecting down and a roll rate signal P which is positive for the right wing deflecting down. The yaw damper control law produces a signal $\beta_{aft}$ in accordance with the following equation $$\dot{\beta}_{aft} = \frac{1}{V_{TAS}}(Ny_{aft} + g\sin\phi) - R + \alpha P.$$

where
$V_{TAS}$ = aircraft true airspeed,
$Ny_{aft}$ = lateral acceleration at the aft galley,
g = acceleration due to the force of gravity,
$\phi$ = bank angle,
R = yaw rate,
$\alpha$ = aircraft angle of attack and
P = roll rate.

Since the IRS system is located in the electronics bay (item 22 in FIG. 1) the IRS produced lateral accelerometer signal must be revised to reflect lateral accelerations at the aft bulkhead.
Namely, $$Ny_{aft} = Ny - \dot{R}L_x$$

Where $L_x$ is the distance between the inertial reference system and the aft bulkhead and $\dot{R}$ is the yaw acceleration.

Thus, the lateral accelerometer signal $N_y$ is passed to the positive input of the summer 120. The output from summer 120 is passed to an integrater block 122, with the output from integrater block 122 being passed to the positive input of the summer 124. Applied to the negative input of summer 124 is the IRS produced yaw rate signal R, as multiplied by a gain factor proportional to the distance $L_x$.

The output from summer 124 is passed through a unity gain buffer 126, with the output from buffer 126 being applied to the negative input of summer 120. Thus, the output from buffer 126 is the desired $N_{yaft}$, i.e., aft bulkhead lateral acceleration signal. The signal $N_{yaft}$ is multiplied in gain block 128 by a level proportional to acceleration due to gravity divided by the aircraft's total aircraft speed $V_{TAS}$, with the result being applied to a positive input of the summer 130.

The IRS produced bank angle signal $\phi$ is first passed through a sine block 140 and then passed through a gain block 142 having a gain factor proportional to $g/V_{TAS}$. The output from gain block 142 is applied to a positive input of a summer 144.

Applied to the other positive input of summer 144 is the IRS produced roll rate signal P as gain factored in gain block 146 by a factor proportional to the aircraft's angle of attack divided by g.

The output from summer 144 is applied to the positive input of a summer 150. Applied to the minus input of summer 150 is the IRS yaw rate produced signal R. The output from summer 150 is applied to a positive input of summer 130.

The output from summer 130 is the $\dot{\beta}$ signal, in accordance with the equation given above.

The $\dot{\beta}$ signal is then passed through a gain schedule block 160. Gain schedule block 160 has a gain factor $K_{\dot{\beta}}$ which is a function of dynamic pressure $Q_c$. Since the force produced by deployment of the rudder is a function of altitude, the gain set by gain schedule block 160 assures proper rudder deployment for a given aircraft altitude.

The summer 110 sums the yaw damper control law signal with the band pass filtered first and second mode accelerometer signals. Thus, the output from summer 110 is a composite signal representing modal acceleration due to flexible body oscillation (from the accelerometers) and rigid body oscillation (as processed by the yaw damper control law).

This digital composite signal is then further filtered through a notch filter 200 which has a transfer characteristic designed to "notch out" higher mode flutter producing signals.

The signal passed through notch filter 200 is then digital-to-analog converted in a D/A converter 202. This signal is then fixed gain amplified in a gain amplifier 204 and low pass filtered, to further filter off flutter inducing signals by analog filter 206. The control signal from analog filter 206 is then passed to the yaw damper servo 208 which, through appropriate linkage 210, is coupled through a linkage summer 212 to the rudder power control unit 214. In the normal manner, redundant systems are provided on the aircraft such that an output from a second, totally redundant yaw damper 220 also passes through appropriate linkage 222 through the linkage summer 212 to the rudder power control unit 214.

FIG. 6 is a detailed block diagram illustrating an alternate preferred embodiment of the invention wherein a single accelerometer is used to sense both the first and second natural modes of the aircraft. As discussed hereinabove, this embodiment has the advantage of utilizing less hardware and thereby being less costly and as such has distinct commercial advantages.

The system as shown is FIG. 6 is identical to the FIG. 5 embodiment with respect to the signal produced out of the yaw damper 20 and the resultant processing through to the rudder power control unit 214. The only difference is in the processing of the signal from the single accelerometer and, as such, only this difference will be discussed hereinbelow.

It was found that the signal produced by the first accelerometer (accelerometer 18 of FIG. 1 located at the aft bulkhead) could be used to sense both first and second mode accelerations. Thus, in the FIG. 6 embodiment the output from the first digital accelerometer 18 is passed both through a low pass filter, comprised of blocks 300, 302 and to the positive input of a summer 304. In this way, the output of summer 304 is the first order high passed accelerometer signal.

The signal out of summer 304 is then passed through a low pass filter comprised of blocks 306, 308 which, along with the signal out of summer 304 passes through a summer 310. As such, the output from summer 310 is the accelerometer signal as passed through a second order high pass filter.

The output from summer 310 is then passed through a notch filter 312.

Figure 7:
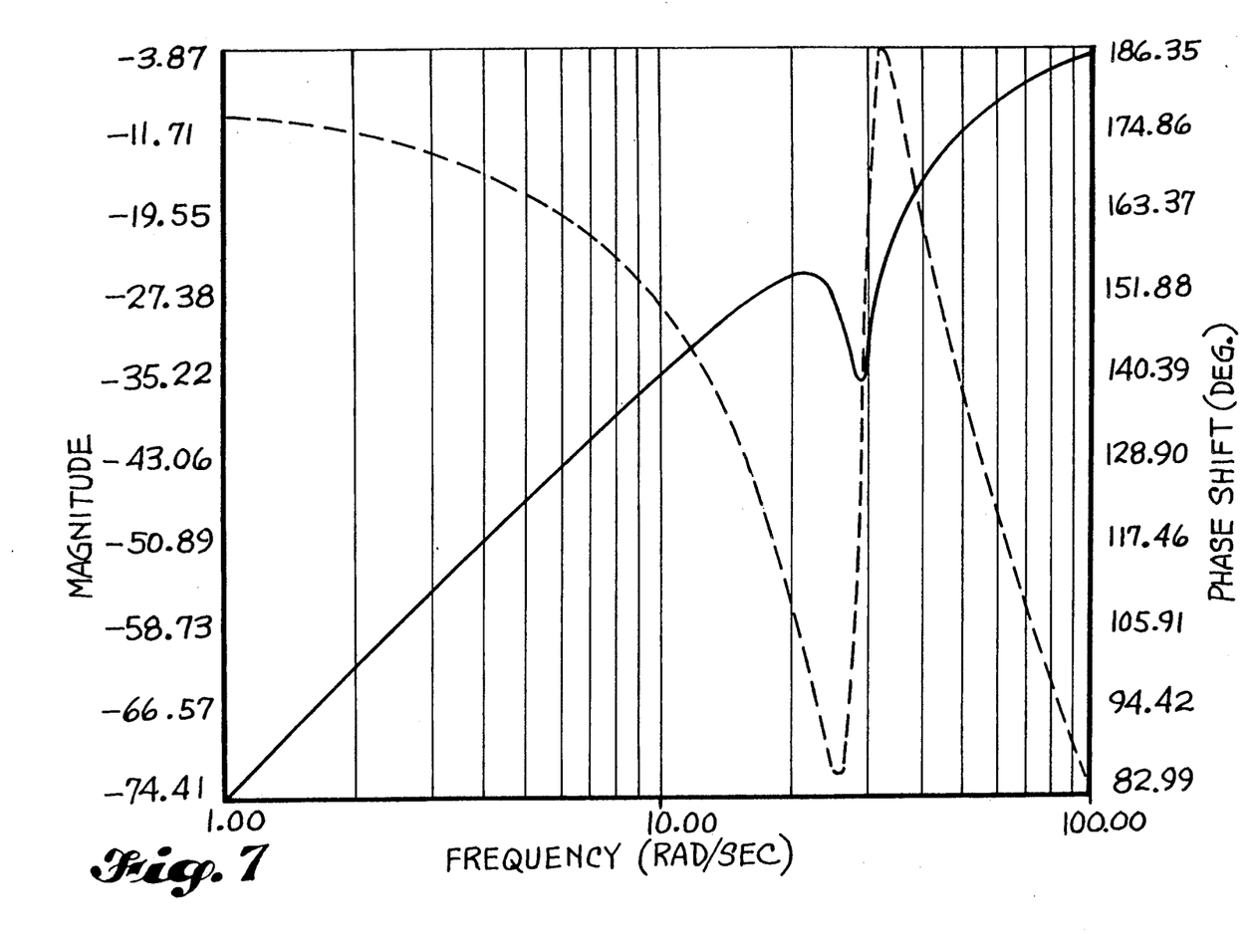
FIG. 7 is a response plot illustrating the filter characteristics of the accelerometer filter used in the single accelerometer embodiment of FIG. 6.

FIG. 7 is a chart depicting both the gain and phase characteristics of the overall filtering of the accelerometer 18 produced signal through the notch filter 312. As can be seen, this composite filtering provides band pass filtering for the first mode and high pass filtering for the second mode and the right phase for each mode. As in the embodiment of FIG. 5, an analog filter 206 used downstream thereby completes the band pass filtering for the second mode.

Also, as described above in the FIG. 5 embodiment, the resultant out of the notch filter 312 is passed through gain schedule block 320 to vary the produced control signal as a function of aircraft true airspeed. This signal is then summed with the yaw damper control signal 20 as described in the FIG. 5 embodiment and then processed as a rudder control signal, also described with respect to FIG. 5.

In summary, an improved aircraft lateral modal suppression system has been described. This system uses one or more fixed accelerometers to directly sense accelerations due to natural mode induced oscillations and is further responsive to aircraft true airspeed to produce a control signal to deploy an aircraft control surface to suppress modal accelerations.

Whereas preferred embodiments of the invention have been described in detail, it should be apparent that many modifications and variations thereto are possible, all of which fall within the true spirit and scope of the invention.

We claim:

1. An aircraft modal suppression control system for suppressing aircraft body deflections due to natural body flexure modes, the modal suppression system comprising:
   control surface means controllably deploying responsive to input control signals;
   sensor means including one sensor predeterminedly located on the aircraft body to produce an excitation signal representative of excitation of the body in at least two natural modes;
   velocity means for producing a velocity signal representative of aircraft velocity; and
   control logic means for producing predetermined control surface control signals responsive to said excitation signal and said velocity signal such that said control surface means is deployed to create forces on the aircraft body to suppress said natural mode excitations.

2. The modal suppression system of claim 1 further comprising:
   altitude means for producing an altitude signal representative of aircraft altitude,
   and wherein said control logic means includes means responsive to said altitude
   signal for producing said predetermined control surface control signals.

3. The modal suppression system of either one of claims 1 or 2 wherein the sensor means comprises:
   an accelerometer positioned on the aircraft at a location to sense said body mode excitations; and
   a band pass filter means for predeterminedly attenuating signals other than the accelerometer produced body mode excitation signals.

4. The modal suppression system of claim 3 wherein said band pass filter means is comprised of a fourth order band pass filter.

5. The suppression system of either one of claims 1 or 2 wherein the sensor means includes an accelerometer located on the aircraft body to produce said acceleration signal representative of acceleration of the body in at least one lateral natural mode.

6. The suppression system of claim 5 wherein the control surface means comprises a rudder.

7. The suppression system of claim 3 wherein said accelerometer is positioned on the aircraft body at a location to sense the first and second body lateral natural modes.

8. The suppression system of claim 7 wherein the control surface means comprises a rudder.

9. An aircraft modal suppression control system for suppressing aircraft body deflections due to natural body flexure modes, the modal suppression system comprising:
   control surface means controllably deploying responsive to input control signals;
   sensor means including means predeterminedly located on the aircraft body to produce an excitation signal representative of excitation of the body in at least one predetermined natural mode; and
   control logic means including filtering means for predeterminedly filtering said excitation signal to produce control surface control signals of predetermined phase to optimally suppress said natural mode excitations.

10. The modal suppression system of claim 9 wherein the sensor means comprises:
    an accelerometer positioned on the aircraft at a location to sense at least one body natural mode; and
    a band pass filter means for predeterminedly attenuating signals other than the accelerometer produced body mode signals.

11. The modal suppression system of claim 10 wherein said band pass filter means is comprised of a fourth order band pass filter.

12. The modal suppression system of claim 9 wherein the sensor means comprises:
    a first accelerometer positioned on the aircraft at a location to sense a first body mode;
    a second accelerometer positioned on the aircraft at a location to sense a second body mode;
    a first band pass filter means for predeterminedly attenuating signals other than the first accelerometer produced first body mode signal; and
    a second band pass filter means for predeterminedly attenuating signals other than the second accelerometer produced second body mode signal.

13. The suppression system of claim 12 wherein:
    said first band pass filter means is comprised of a fourth order band pass filter; and
    a second band pass filter means is comprised of a second order band pass filter.

14. The suppression system of claim 9 wherein the sensor means includes an accelerometer located on the aircraft body to produce said acceleration signal representative of acceleration of the body in a lateral natural mode.

15. The suppression system of claim 14 wherein the control surface means comprises a rudder.

16. The suppression system of claim 10 wherein said accelerometer is positioned on the aircraft body at a location to sense the first and second body lateral modes.

17. The suppression system of claim 16 wherein the control surface means comprises a rudder.

18. The suppression system of claim 12 wherein:
said first accelerometer is positioned on the aircraft at a location to sense the first body lateral mode; and
said second accelerometer is positioned on the aircraft at a location to sense the second body lateral mode.

19. The suppression system of claim 18 wherein the control surface means comprises a rudder.

* * * * *